United States Patent
Nakamura et al.

(10) Patent No.: US 6,721,485 B1
(45) Date of Patent: Apr. 13, 2004

(54) ECHELON DIFFRACTION GRATING AND OPTICAL WAVEGUIDE ELEMENT

(75) Inventors: Koichiro Nakamura, Osaka (JP); Masahiro Hori, Osaka (JP); Hiroaki Yamamoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 14 days.

(21) Appl. No.: 09/806,416

(22) PCT Filed: Aug. 1, 2000

(86) PCT No.: PCT/JP00/05076

§ 371 (c)(1), (2), (4) Date: Mar. 30, 2001

(87) PCT Pub. No.: WO01/11393

PCT Pub. Date: Feb. 15, 2001

(30) Foreign Application Priority Data

Aug. 4, 1999 (JP) .......................................... 11-221403

(51) Int. Cl.$^7$ ................................................. G02B 6/00
(52) U.S. Cl. ........................ 385/143; 385/141; 385/142; 385/144
(58) Field of Search ................................. 385/142, 143, 385/144, 145, 141, 123, 124

(56) References Cited

U.S. PATENT DOCUMENTS

| | | | | | |
|---|---|---|---|---|---|
| 3,929,704 | A | * | 12/1975 | Horning | 427/208.4 |
| 4,025,485 | A | * | 5/1977 | Kodama et al. | 524/729 |
| 4,359,369 | A | * | 11/1982 | Takamizawa et al. | 430/286.1 |
| 4,443,502 | A | * | 4/1984 | Gutek | 427/387 |
| 4,467,082 | A | * | 8/1984 | Shirahata et al. | 522/35 |
| 4,736,360 | A | * | 4/1988 | McMahon | 359/130 |
| 6,069,988 | A | * | 5/2000 | Kokura et al. | 385/37 |
| 6,188,529 | B1 | * | 2/2001 | Koyama et al. | 353/37 |
| 6,361,718 | B1 | * | 3/2002 | Shinmo et al. | 264/1.21 |
| 6,372,341 | B1 | * | 4/2002 | Jung et al. | 428/354 |

FOREIGN PATENT DOCUMENTS

| | | | |
|---|---|---|---|
| EP | 250824 | 1/1988 | G02B/6/12 |
| EP | 254453 | 1/1988 | G02B/9/18 |
| EP | 985510 | 3/2000 | B29C/41/12 |
| JP | A-62-102445 | 5/1987 | |
| JP | 62102445 | 5/1987 | G11B/7/26 |
| JP | A-62-225273 | 10/1987 | |
| JP | 62225273 | 10/1987 | B05D/5/06 |
| JP | A-62-287210 | 12/1987 | |
| JP | 62287210 | 12/1987 | G02B/6/12 |
| JP | 6333714 | 2/1988 | G02B/5/18 |

(List continued on next page.)

OTHER PUBLICATIONS

Donald McMahon, et al., Applied Optics, vol. 26, No. 11, pp. 2188–2196 (1987).

(List continued on next page.)

*Primary Examiner*—Michael P. Stafira
*Assistant Examiner*—Kaveh Kianni
(74) *Attorney, Agent, or Firm*—Wenderoth, Lind & Ponack LLP (57) ABSTRACT

An echelon diffraction grating which has excellent heat resistance and can be produced at a low cost and an optical waveguide which has high heat resistance, small absorption of a communication wavelength of a near infrared range, and satisfies reliability and a low loss at an optical communication range.

The echelon diffraction grating comprises a substrate, and an organopolysiloxane film having a maximum thickness of 1 μm to 1 mm formed on the surface of the substrate and has a plurality of steps having a predetermined width of 1 to 500 μm and a predetermined height of 5 to 500 μm formed on the organopolysiloxane film, and the organopolysiloxane film contains dimethylsiloxane and phenyl(or substituted phenyl-)siloxane as essential ingredients.

5 Claims, 1 Drawing Sheet

FOREIGN PATENT DOCUMENTS

| | | | |
|---|---|---|---|
| JP | A-63-033714 | 2/1988 | |
| JP | A-63-049702 | 3/1988 | |
| JP | 63049702 | 3/1988 | G02B/5/18 |
| JP | 6242303 | 9/1994 | G02B/3/00 |
| JP | A-6-242303 | 9/1994 | |
| JP | 406248186 * | 9/1994 | C08L/83/06 |
| JP | 9-324051 | 12/1997 | C08G/77/04 |
| JP | A-10-142410 | 5/1998 | |
| JP | 10142410 | 5/1998 | G02B/5/18 |

OTHER PUBLICATIONS

M. Born, et al., Principles of Optics, Macmillan, New York, pp. 408–411, (1964).

Ryoko Yoshimura, et al., Journal of Lightwave Technology, vol. 16, No. 6, pp. 1030–1037, (1998).

Mitsuo Usui, et al., Journal of Lightwave Technology, vol. 14, No. 10, pp. 2338–2343, (1996).

Wave Optics, pp. 145–149, (1971).

Atsunori Matsuda, et al., J.Am. Ceram. Soc., vol. 81, No. 11, pp. 2849–2852, (1998).

Donald H. Mcmaon, Applied Optics, vol. 26, No. 11, pp 2188 (1987).

J. Am. Ceram. Soc., vol. 81, No. 11, pp 2849–2852 (1998).

Ryoko Yoshimura, J. of Lightwave Technology, vol. 16, No. 6 (1998).

Mitsuo Usui J. of Lightwave Technology, vol. 14, No. 10 (1996).

WaveOptics pp 145–149 (Feb. 2, 1971).

M. Born and E. Wolf, Principles of Optics (Macmillan, New York, 1964) pp 408–411.

* cited by examiner

ECHELON DIFFRACTION GRATING AND OPTICAL WAVEGUIDE ELEMENT

FIELD OF THE INVENTION

The present invention relates to an optical element having concave and convex portions as parallel grooves on the surface of a substrate and, particularly, to a diffraction grating and an optical waveguide element.

DESCRIPTION OF THE PRIOR ART

Optical parts such as a diffraction grating and an optical waveguide are combined together to serve as an integrated optical element for transmitting light by convergence or diffusion.

As for the diffraction grating, the following diffraction gratings (1) to (6) are known.
(1) Diffraction gratings which are a laminate consisting of glass sheets with a thickness difference of "d" arranged in tiers (refer to A. A. Michelson: Astrophys. J. no. 8, pp. 36, 1893).
(2) Diffraction gratings produced by precision machining, silicon photolithography and selective etching (Donald H. McMaon, Applied Optics, vol. 26, no. 11, pp. 2188 (1987), JP-A 63-33714, U.S. Pat. No. 4,736,360) (the term "JP-A" as used herein means an "unexamined published Japanese patent application").
(3) Diffraction gratings produced by a method in which a hydrolysis solution prepared from a metal alcoholate is pressed against a transfer mold and cured by heat and light (JP-A 62-102445, JP-A 62-225273 and JP-A 10-142410). Out of these, JP-A 62-102445 discloses a process for producing a diffraction grating by a so-called sol-gel method in which a solution containing silicon alkoxide is applied to the surface of a glass substrate and heated while a mold having concave and convex portions is pressed against the solution to form concave and convex portions.
(4) There is known a method (refer to JP-A 63-49702) in which an ultraviolet curable resin is uniformly spread over a substrate and irradiated with ultraviolet radiation while a mold having concave and convex portions is pressed against the resin.
(5) JP-A 6-242303 discloses a method for forming a plurality of layers on a substrate when a film as thick as more than several micrometers is to be formed by a sol-gel method. In this case, constituents for each layer are prepared in the form of a solution or sol, pressurized and heated while a mold is pressed against the solution or sol, completely solidified as a layer, and then a solution or sol is further poured over the solidified layer to form an upper layer.
(6) J. Am. Ceram. Soc., vol. 81, no. 11, pp. 2849 to 2852 (1998) discloses a method for producing an optical disk having a fine groove structure by applying a solution containing methyl triethoxysilane and tetraethoxysilane to the surface of a substrate.

As for the optical waveguide element, besides those produced from inorganic materials, there are known optical waveguide elements produced from organic materials such as
(7) PMMA (Ryoko Yoshimura. J. of Lightwave Technology, vol. 16, no. 6 (1998)), (8) a polyimide and (9) a silicon-based polymer (Mitsuo Usui, J. of Lightwave Technology, vol. 14, no. 10 (1996)) by photolithography and etching.

However, the above prior arts have the following problems. First, it cannot be said that the above method (1) has excellent productivity because a technology for laminating thin glass sheets precisely is extremely difficult. Further, it is impossible to apply the method to a diffraction grating having a lens function like a concave grating.

The method (2) makes use of photolithography and needs a complicated step. The surface of the obtained diffraction grating has a shape depending on the surface of a crystal grating forming a diffraction grating and the height of each step can be set only to a limited range in fact.

The method (3) has such a problem that the thickness of a film forming a diffraction grating is several micrometers or less and diffraction efficiency greatly depends on the polarization of light as the cycle and height of concave and convex portions forming the diffraction grating are close to the wavelength of light used for optical communication, for example, 1.3 $\mu$m or 1.55 $\mu$m. When the thickness of the film is made large enough to form a diffraction grating having a larger step height than the wavelength of light in order to reduce dependence on polarization, the film easily cracks and is inferior in heat resistance.

As for the method (4), the ultraviolet curable resin decomposes or yellows at a temperature higher than 250° C. due to its low heat resistance. Therefore, the substrate having concave and convex portions of the ultraviolet curable resin cannot be soldered and difficult to be attached to a device.

The method (5) is a method for forming a laminate by molding organopolysiloxane layers one after another, which makes it possible to form an organopolysiloxane layer having concave and convex surface and a thickness of several tens of micrometers. However, the production process is long, thereby boosting costs. Further, since the next layer is formed after an underlying layer is completely cured, undesired air is contained between a mold and a solution or sol with the result of low dimensional accuracy of concave and convex portions.

Further, the method (6) is capable of producing an optical disk having a sol-gel film with a maximum film thickness of less than 300 nm. However, when the formed film is heated at a temperature required for soldering, for example, 350° C. and then cooled to form a diffraction grating having a film thickness of 500 nm to several micrometers, the film cracks.

Meanwhile, as for the optical waveguide, optical waveguide elements made from inorganic materials have high reliability but cannot be mass-produced at a low cost. As for optical waveguide elements made from the above organic materials (7) to (9), there are few materials which are satisfactory in terms of heat resistance and a complicated step such as photolithography or etching is needed to form a core portion for transmitting light.

The present invention has been made in view of the above problems of the prior art.

SUMMARY OF THE INVENTION

It is therefore an object of the present invention to provide an echelon diffraction grating which can be produced at a low cost and has excellent heat resistance.

It is another object of the present invention to provide an optical waveguide which has high heat resistance and small absorption at a communication wavelength of a near infrared range, and satisfies reliability and a low loss at an optical communication band by a simple production process.

Other objects and advantages of the present invention will become apparent from the following description.

Firstly, according to the present invention, the above objects and advantages of the present invention are attained by an echelon diffraction grating which comprises a substrate and an organopolysiloxane film having a maximum thickness of 1 μm to 1 mm formed on the surface of the substrate, and has a plurality of steps having a predetermined height of 5 to 500 μm and a predetermined width of 1 to 500 μm formed on the organopolysiloxane film, wherein the organopolysiloxane film contains dimethylsiloxane represented by the following chemical formula (1) and a phenylsiloxane represented by the following chemical formula (2) as essential ingredients:

$$(CH_3)_2SiO_{2/2} \tag{1}$$

$$PhSiO_{3/2} \tag{2}$$

wherein Ph is a phenyl group or substituted phenyl group.

Figure 2:
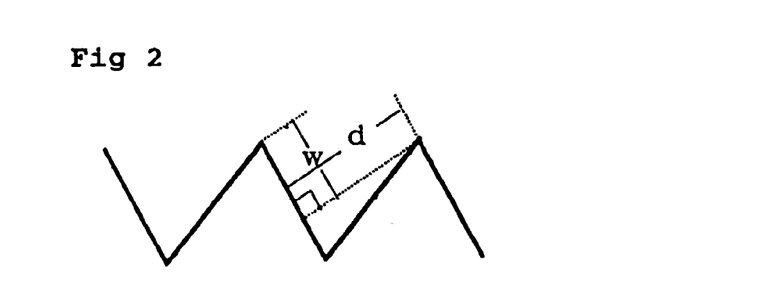
FIG. 2 is a sectional view showing the details of the steps of the echelon diffraction grating of FIG. 1, wherein "d" represents a step height and "w" is a step width.

The predetermined height and the predetermined width correspond to "d" and "w" in the attached FIG. 2, respectively.

Secondly, according to the present invention, the above objects and advantages of the present invention are attained by an optical waveguide element which comprises a core portion for transmitting light, formed on the surface of a substrate and having a height of 1 to 30 μm and a width of 1 to 30 μm and length extending along the surface of the substrate, and a clad portion surrounding the core portion or interposed between the core portion and the substrate, wherein at least one of the core portion and the clad portion contains dimethylsiloxane represented by the following chemical formula (1) and a phenylsiloxane represented by the following chemical formula (2) as essential ingredients:

$$(CH_3)_2SiO_{2/2} \tag{1}$$

$$PhSiO_{3/2} \tag{2}$$

wherein Ph is a phenyl group or substituted phenyl group.

DETAILED DESCRIPTION OF THE INVENTION

A description is first given of the echelon diffraction grating of the present invention. As for the echelon diffraction grating, please refer to "Wave Optics" (1971-2-2) written by Hiroshi Kubota and published by Iwanami Shoten, pp. 145–149. As for ordinary diffraction gratings other than echelon diffraction gratings, angular diffusion is represented by the following formula (3) (M. Born and E. Wolf, Principles of Optics (Macmillan, New York, 1964), pp. 408–411):

$$d\theta/d\lambda = m/[W \cdot \cos(\theta)] \tag{3}$$

wherein dθ/dλ is a change in diffraction angle at a wavelength, m is the order of diffraction and W is the spatial periodicity of a grating.

In an ordinary diffraction grating, the total number N of grating lines is increased to improve resolution. That is, W in the above formula (3) must be made small. However, in a reflection or transmission type echelon diffraction grating having a saw-toothed groove section, the order m is made large by increasing the tolerance D of optical path length (step height d) to improve resolution. When a reflection type echelon diffraction grating is used, the step height is represented by d, the tolerance of optical path length by D, the order by m and the wavelength by λ, the following equation (4) is established.

$$m = D/\lambda = 2d/\lambda \tag{4}$$

When resolution is represented by R, the order by m and the total number of grating lines by N, the following equation (5) is established.

$$R = mN \tag{5}$$

An observation width Δλ for preventing light diffracted by an order of m from overlapping with the adjacent light diffracted by an order of (m+1) is represented by the following equation (6):

$$\alpha\lambda = \lambda/m \tag{6}$$

As for the communication wavelength band of optical fiber communication, the minimum loss wavelength band of the used fiber (wavelength band at which the transmission loss becomes minimum), that is, 1.55 μm or 1.3 μm is generally selected. When this echelon diffraction grating is used as a multiplexing/multi-separation optical element for wavelength division multiplex communication at this wavelength band, the step height d (μm) of the echelon diffraction grating is preferably selected to satisfy either one or both of the following equations (7) and (8):

$$d = m \cdot \lambda_1/2 = 0.775 \cdot m \tag{7}$$

($\lambda_1 = 1.55$ μm, and m is a natural number)

$$d = m \cdot \lambda_2/2 = 0.65 \cdot m \tag{8}$$

($\lambda_2 = 1.30$ μm, and m is a natural number)

By selecting a step height d which satisfies the equation (7), light having a wavelength of 1.55 μm can be blazed as light diffracted by an order of m efficiently. By selecting a step height d which satisfies the equation (8), light having a wavelength of 1.30 μm can be blazed as light diffracted by an order of m efficiently. Further, by selecting a step height d which satisfies both the equations (7) and (8), light having a wavelength of 1.55 μm and light having a wavelength of 1.30 μm can be blazed at the same time. The preferred step height d (μm) of the echelon diffraction grating for an order of m (1 to 43) is shown in Table 1. The same shall apply when m is 44 or more. The most preferred step height d at which light having a wavelength of 1.55 μm and light having a wavelength of 1.30 μm can be blazed at the same time is 20.15 μm or a multiple thereof. Light having a wavelength of 1.55 μm and light having a wavelength of 1.30 μm can be blazed at the same time at a step height d of about 7.75 μm, about 12.375 μm, about 16.262 μm, about 24.037 μm and about 27.925 μm. The echelon diffraction grating of the present invention has a predetermined step height of 5 to 500 μm. The step height is more preferably 10 to 100 μm.

TABLE 1 step height (μm)

| order m | light having wavelength of 1.30 μm (d = 0.775 · m) | light having wavelength of 1.55 μm (d = 0.650 · m) |
|---|---|---|
| 1 | 0.775 | 0.650 |
| 2 | 1.550 | 1.300 |
| 3 | 2.325 | 1.950 |
| 4 | 3.100 | 2.600 |
| 5 | 3.875 | 3.250 |
| 6 | 4.650 | 3.900 |
| 7 | 5.425 | 4.550 |
| 8 | 6.200 | 5.200 |
| 9 | 6.975 | 5.850 |
| 10 | 7.750 | 6.500 |
| 11 | 8.525 | 7.150 |
| 12 | 9.300 | 7.800 |
| 13 | 10.075 | 8.450 |
| 14 | 10.850 | 9.100 |
| 15 | 11.625 | 9.750 |
| 16 | 12.400 | 10.400 |
| 17 | 13.175 | 11.050 |
| 18 | 13.950 | 11.700 |
| 19 | 14.725 | 12.350 |
| 20 | 15.500 | 13.000 |
| 21 | 16.275 | 13.650 |
| 22 | 17.050 | 14.300 |
| 23 | 17.825 | 14.950 |
| 24 | 18.600 | 15.600 |
| 25 | 19.375 | 16.250 |
| 26 | 20.150 | 16.900 |
| 27 | 20.925 | 17.550 |
| 28 | 21.700 | 18.200 |
| 29 | 22.475 | 18.850 |
| 30 | 23.250 | 19.500 |
| 31 | 24.025 | 20.150 |
| 32 | 24.800 | 20.800 |
| 33 | 25.575 | 21.450 |
| 34 | 26.350 | 22.100 |
| 35 | 27.125 | 22.750 |
| 36 | 27.900 | 23.400 |
| 37 | 28.675 | 24.050 |
| 38 | 29.450 | 24.700 |
| 39 | 30.225 | 25.350 |
| 40 | 31.000 | 26.000 |
| 41 | 31.775 | 26.650 |
| 42 | 32.550 | 27.300 |
| 43 | 33.325 | 27.950 |

When the echelon diffraction grating of the present invention is used as a reflection type diffraction grating, the step width W is preferably larger than the communication wavelength λ in use. By making the step width W larger than the communication wavelength λ, a difference in diffraction efficiency caused by a difference in the polarization of light can be eliminated. The step width W of a reflection type echelon diffraction grating having excellent polarization characteristics is preferably 3 times or more, more preferably 5 times or more the wavelength λ. Therefore, the echelon diffraction grating of the present invention has a predetermined step width of 1 to 500 μm. The step width is preferably 3 to 100 μm.

The echelon diffraction grating of the present invention may be used as an integrated optical device when it is used in combination with another optical element. For example, it can be used as optical communication, particularly, a wavelength separation optical element in a wavelength monitor module for high-density multiplexing/multi-separation. The high-density wavelength division/multiplexing (DWDM) technology is an extremely important technology for transmitting a plurality of signals over a single optical path simultaneously because it can increase communication capacity without boosting costs in an optical fiber communication system. That is, the system capacity can be expanded by increasing the number of communication channels which can be transmitted by an optical fiber. Light having a wavelength of 1.55 μm and light having a wavelength of 1.3 μm are used as signals for optical communication. A diffraction grating which diffracts the light having these wavelengths at high efficiency and has excellent wavelength resolution is preferably used.

Since the diffraction grating of the present invention has excellent heat resistance and environmental resistance, it is preferably used as a micro-optical element which requires high accuracy. When the diffraction grating of the present invention is used as a wavelength monitor module for high-density multiplexing/multi-separation, it is used in combination with an optical fiber, collimator lens and photosensitive semiconductor element. When an ordinary diffraction grating is used as a reflection type optical element, the diffraction efficiency may greatly lower according to the polarization state of light. In this case, polarization characteristics must be improved by inserting a polarizing filter and a polarization converter between the collimator lens and the diffraction grating. Since the step width of the echelon diffraction grating of the present invention is made larger than the wavelength of light in use, polarization dependence is not developed, thereby making it possible to manufacture an integrated optical element which has excellent polarization characteristics, namely, can retain high diffraction efficiency regardless of the polarization state of light. The echelon diffraction grating of the present invention, collimator lens and an array of photosensitive semiconductor elements may be arranged in the order named, and an array of microlenses may be arranged between the collimator lens and the array of photosensitive semiconductor elements in such a manner that they are in contact with the array of photosensitive semiconductor elements. The array of microlenses are marketed under the trade name of PML by NSG America, Inc. By using the array of microlenses, crosstalk between adjacent semiconductor elements of the array of photosensitive semiconductor elements can be made small. Alternatively, by combining the array of microlenses with another diffraction grating or optical element such as a prism, overlapped light diffracted by different orders of the echelon diffraction grating of the present invention can be dispersed in a vertical direction, thereby making it possible to obtain a spectrum having good resolution at a wide range.

A description is subsequently given of the material for forming the echelon diffraction grating of the present invention.

The polyorganosiloxane film forming the echelon diffraction grating of the present invention contains dimethylsiloxane represented by the above formula (1) and a phenylsiloxane represented by the above formula (2) (some of the hydrogens of a phenyl group may be substituted by a halogen atom (such as chlorine or fluorine), alkyl group such as methyl, ethyl or propyl, or alkenyl group such as vinyl or allyl). The polyorganosiloxane film is formed by selecting raw materials for a sol-gel material which provide dimethylsiloxane represented by the above formula (1) and a phenylsiloxane represented by the above formula (2) through hydrolytic and dehydration/condensation reactions.

Preferred examples of a raw material for a sol-gel material which provides dimethylsiloxane represented by the above formula (1) (to be referred to as "component (A)" hereinafter) include dimethyl dialkoxysilanes such as dimethyl diethoxysilane and dimethyl dimethoxysilane; and dimethyl dihalidesilanes such as dimethyl dichlorosilane and dimethyl dibromosilane. Condensates of a dimethylsilsesquioxy group, for example, hexamethylcyclotrisiloxane, octamethylcyclotetrasiloxane and decamethylcyclopentasiloxane may also be used. When dimethylsiloxane-d6 obtained by substituting a hydrogen atom (H) in dimethylsiloxane with a heavy hydrogen atom (D) is used in the core of an optical waveguide, the transmission of light having a wavelength of 1.55 μm improves advantageously. Dimethylsiloxane-d6 is preferably used as a material for a transmission type diffraction grating.

Examples of a raw material for a sol-gel material which provides a phenylsiloxane represented by the above formula (2) (to be referred to as "component (B)" hereinafter) include trialkoxysilanes having a phenyl group or substituted phenyl group, such as phenyltriethoxysilane, phenyltrimethoxysilane, triethoxysilane having a substituted phenyl group with a halogen atom, for example, a chlorine atom substituted for some of the hydrogen atoms, for example, 1 to 4 hydrogen atoms of the five hydrogen atoms of a phenyl group, and trimethoxysilane having the same substituted phenyl group as described above; phenyltrichlorosilane and trichlorosilane having a by substituted phenyl group with a halogen atom, for example, a chlorine atom substituted for some of the hydrogen atoms, for example, 1 to 4 hydrogen atoms of the five hydrogen atoms of a phenyl group; biphenyltrimethoxysilane and biphenyltriethoxysilane; and biphenyltrichlorosilane. When phenyltriethoxysilane-d5 having a heavy hydrogen atom (D) or fluorine atom (F) substituted for the hydrogen atom (H) of a phenyl group, or pentafluorophenyl triethoxysilane is used as a material for the core of an optical waveguide and a transmission type diffraction grating, the transmission of light having a wavelength of 1.55 μm improves advantageously.

When an alkoxysilane such as methoxysilane or ethoxysilane is used as the components (A) and (B), an alcohol formed by a hydrolytic reaction easily volatilizes advantageously. A preferred combination of the components (A) and (B) of the sol-gel material is a combination of a dimethyl dialkoxysilane and a phenyltrialkoxysilane.

The components (A) and (B) are used as raw materials for a sol-gel material in the present invention. A methyl group and a phenyl group (or substituted phenyl group) remain in large quantities in the film finally obtained by coating the substrate with the obtained sol-gel material. Since the methyl group and phenyl group (or substituted phenyl group) serve to provide elasticity to the film by reducing the fragility of the film, they can suppress thermal stress generated in the interior of the film, thereby preventing the cracking of the film and the peeling off of the film from the substrate of an article.

A case where the component (A) is a dimethy dialkoxysilane and the component (B) is a trialkoxysilane containing a phenyl group will be described hereinafter.

It is presumed that the trialkoxysilane is connected to the terminals of the linear dimethylsilane extending in a fibrous manner three-dimensionally by mixing dimethylsilane and trialkoxysilane, whereby room is formed in the three-dimensional skeleton and this film structure provides elasticity to the film and reduces the fragility of the film, thereby making it possible to form a thick film.

The fact that the film according to the present invention contains a phenyl group (or substituted phenyl group) means that the phenyl group is bulky enough to provide elasticity to the skeleton structure of an oxide contained in the film by reducing the fragility of the film and also has stability at high temperatures due to its conjugated system compared with other organic groups. For example, a film containing a cyclohexyl trialkoxysilane having a cyclohexyl group without a conjugated system substituted for a phenyl group and a dimethyl dialkoxysilane discolors and cracks at a temperature of 2 to 300° C.

The raw materials for a sol-gel material preferably include both of the components (A) and (B) (total number of mols when the component (B) is a combination of a trialkoxysilane containing a phenyl group and a trialkoxysilane containing a substituted phenyl group) in a molar ratio of 1:0.3 to 1:9. When the amount of the component (B) is smaller than 0.3 mol, the film is hardly cured, most of the components volatilize at the time of final heating (baking), and the film may be hardly formed in the end. When the amount of the component (B) is larger than 9 mols, the flexibility of the film is impaired and the film having a thickness of 20 μm or more easily cracks at the time of final heating or cooling after final heating. Both of the components (A) and (B) are preferably contained in a molar ratio of 1:0.4 to 1:1.

The raw materials for a sol-gel material in the present invention preferably include an alcohol as a solvent which is added to a mixture of the components (A) and (B). The alcohol is preferably a lower alcohol having 1 to 4 carbon atoms, particularly preferably methanol or ethanol having a low boiling point. The reason for this is that an alcohol can be removed rapidly from the solution by heating at a relatively low temperature after hydrolysis. The molar ratio of amount of the alcohol added to the total amount of the components (A) and (B) is preferably 0.3:1 to 3:1, more preferably 0.5:1 to 1.5:1.

A catalyst for hydrolyzing the components (A) and (B) is added to the raw material solution. The catalyst is preferably an acid catalyst. The acid catalyst is preferably used in the form of an aqueous solution containing at least one of formic acid, acetic acid, tetrafluoroacetic acid, propionic acid, oxalic acid, hydrochloric acid, nitric acid and sulfuric acid. If the amount of the acid catalyst added which differs according to the type of the acid and the strength (weak or strong acid) of protonic acid is too small, the proceeding of hydrolytic and dehydration/condensation reactions will become slow and if the amount is too large, the condensation reaction will proceed too far, the molecular weight will become too large, and the gelatin of a precipitate or coating solution will readily occur disadvantageously. To ensure that the above solution for forming a film should contain the silane compounds (A) and (B) in the form of unhydrolysates in amounts of 0.5 to 40% and 0.5 to 60% based on the amounts of the silane compounds (A) and (B) contained in the above raw material solution, respectively, organic acids which are weak acids out of the above acid catalysts are preferably used. Out of the organic acids, formic acid is particularly preferred because it has a small molecular weight and easily evaporates. The amount of the acid catalyst to be added is preferably 0.5 to 5 mmol, more preferably 0.7 to 2 mmol based on 1 mol of the total of the components (A) and (B) when formic acid is used as the acid catalyst. It is preferred to add water in an amount more than a stoichiometric amount required for hydrolysis. When the amount of water is smaller than the stoichiometric amount, the unreacted silane compounds (A) and (B) easily evaporate during a heat treatment for gelation. The amount of water including water of the aqueous solution of the catalyst is generally 1.1 to 30 times the required stoichiometric amount and the molar ratio thereof to the total of the components (A) and (B) is preferably 2:1 to 20:1, more preferably 3:1 to 10:1. When the optical element of the present invention is located in close vicinity to a memory or other electronic circuit, if chlorine is contained in the optical element of the present invention, it may shorten the service life of the electronic circuit. Therefore, an acid catalyst containing no chlorine is preferably used.

In the present invention, a solution containing the components (A) and (B), alcohol solvent, water and catalyst as the raw materials for a sol-gel material is prepared by hydrolyzing both alkoxysilanes while they are stirred at room temperature for 90 to 120 minutes. A metal oxide particles such as silica, titania, alumina, zirconia and ceira, or an inorganic fine particle such as calcium carbonate, having a particle diameter of 1 µm or less, preferably 0.5 µm or less, may be contained in the above solution as a thermal shrinkage inhibitor in a total amount of 30 wt % or less based on the total solid content of the above solution. A tetraalkoxide of silicon, tetraalkoxide of titanium,. tetraalkoxide of zirconium, tetraalkoxide of germanium and trialkoxide of aluminum may be further contained as a refractive index modifier in a total amount of 30 mol % or less based on the total of the components (A) and (B). Thereafter, it is desired to promote a dehydration/polycondensation reaction by maintaining the temperature at room temperature to 140° C., preferably 70 to 100° C. for 6 to 30 hours and to vaporize and evaporate an alcohol and water which are dehydration/polycondensation reaction products, or the solvent and water contained in the solution. As a result, the mass and volume of the solution decrease to 25 to 35% by weight or volume of the initial mass and volume thereof. Thereby, the shrinkage of the formed film is suppressed as much as possible to prevent the cracking of the film and to enable the formation of a cured film without forming air bubbles in the film at the time of final heating. If the dehydration/polycondensation reaction proceeds too far, the viscosity of the solution will become too high, thereby making it difficult to coat the surface of the mold or the substrate. If the dehydration/polycondensation reaction proceeds insufficient, the formation of air bubbles in the film at the time of final heating cannot be prevented. It is preferred to control the proceeding of the dehydration/polycondensation reaction by selecting temperature and retention time to control the viscosity of the solution to $10^3$ poise or less.

A description is subsequently given of the method of forming the echelon diffraction grating of the present invention.

The echelon diffraction grating of the present invention can be machined to a desired stepped form by such means as photolithography or reactive ion etching after a polyorganosiloxane film is formed from a material for forming the echelon diffraction grating of the present invention. Alternatively, the polyorganosiloxane film is contacted to a mold having a stepped form, for example, an echelon diffraction grating itself, cured by heating and machined to a stepped form.

Two typical processes for molding an optical element covered with a gelled film having a surface which is the inversion of the surface of the mold by adhering the above sol-gel material between the substrate and the mold, arranging it in the form of a film, and heating are as follows.

The first process (to be referred to as "mold pouring process" hereinafter) comprises pouring a sold-gel material solution into a mold, heating, contacting the substrate of an article to the material and further heating to bond the molded film to the substrate, releasing the mold and finally heating the film. That is, the mold having a fine uneven surface is maintained horizontal, the liquid sol-gel material having a viscosity of $10^3$ poise or less is poured into the mold to fill depressed portions of the mold. In place of pouring, the mold may be immersed in a bath of the sol-gel material, or the sol-gel material solution may be applied to the surface of the mold with a brush. In this state, a dehydration/polycondensation reaction is promoted by maintaining the temperature at 140 to 180° C. for 20 to 120 minutes until the viscosity of the sol-gel material spread over the mold becomes $10^4$ to $10^8$ poise.

Thereafter, the substrate is brought into close contact with the mold so that the sol-gel material contacts the surface of the substrate without forming any gap therebetween, and maintained at 140 to 180° C. for 10 to 120 minutes to almost complete the dehydration/polycondensation reaction of the sol-gel material for gelation. By removing and releasing the mold, a polysiloxane film, a soft gelled film having an uneven surface which is the inversion of the uneven surface of the mold is formed on the substrate in such a manner that it is bonded to the surface of the substrate. When the mold is released too early, the polysiloxane film is so soft that its uneven surface is deformed by its own weight. Therefore, the above heating is carried out until this deformation does not occur.

The film is finally heated at 180 to 350° C. for 10 to 150 minutes to polycondense the residual silanol group of the polysiloxane film and vaporize water formed by polycondensation, whereby the film slightly shrinks in volume in a thickness direction to become a fine film. Thus, an optical element covered with a film having a surface which is the inversion of the surface of the mold is obtained.

The second process (to be referred to as "substrate pouring process" hereinafter) comprises pouring the sol-gel material solution directly over the surface of the substrate, heating, pressing a mold against the film on the surface of the substrate of an article when the liquid film achieves plasticity (the viscosity of the liquid becomes $10^4$ to $10^8$ poise), heating in this state, transfer molding, releasing the mold and finally heating the film. That is, the surface to be coated of the substrate of the article is maintained horizontal, the liquid sol-gel material having a viscosity of $10^3$ poise or less is poured over the substrate and spread over the substrate into the form of a film having a predetermined thickness. In this state, a dehydration/polycondensation reaction is carried out at 140 to 180° C. for 20 to 120 minutes until the viscosity of the poured sol-gel material becomes 1 to $10^8$ poise. The mold having a fine uneven surface is pressed against the film-like sol-gel material and maintained at a pressure of 0.5 to 120 kg/cm² and a temperature of 160 to 350° C. for 60 seconds to 60 minutes to almost complete the dehydration/polycondensation reaction of the sol-gel material for gelation. By removing the mold, a polysiloxane film, a gelled film having an uneven surface which is the inversion of the uneven surface of the mold is formed on the substrate in such a manner that it is bonded to the surface of the substrate. It is finally heated at 180 to 350° C. for 10 to 150 minutes to polycondense the residual silanol group of the polysiloxane film and vaporize water formed by this polycondensation, whereby the film slightly shrinks in volume in a thickness direction to become a fine film. Thus, an optical element covered with a film having a surface which is the inversion of the surface of the mold is obtained.

As for the above mold, the flat surface of a glass substrate is etched precisely to form a concave mold having a target shape, for example. A convex metal mother die can be produced by electroless plating and electrolytic plating using this as a master mold. A convex metal master mold can be produced by the above plating using the above concave mold as a mother die and further a concave metal mother die can be produced by the above plating using this master mold. These convex and concave mother dies can be used as molds. In the above plating, a metal such as nickel or chromium is preferably used. A resin mother die may be fabricated from an ultraviolet -curable resin by 2P molding using the master mold produced by the above method and used as a mold.

Figure 1:
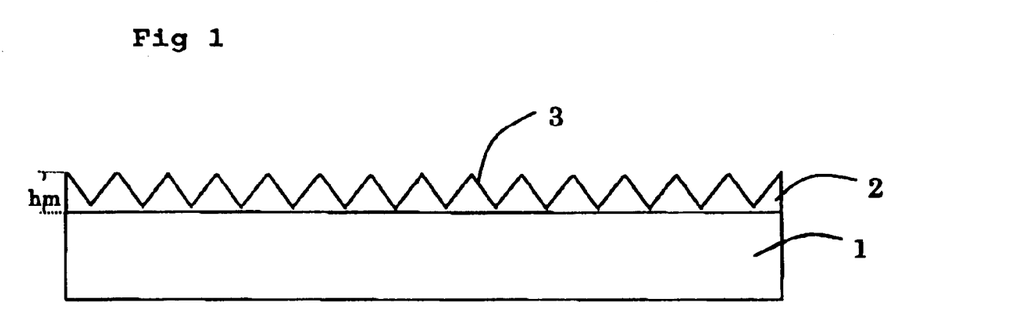
FIG. 1 is a sectional view of the echelon diffraction grating of the present invention, wherein reference numeral 1 denotes a substrate, 2 an organopolysiloxane film and 3 steps.
Figure 3:
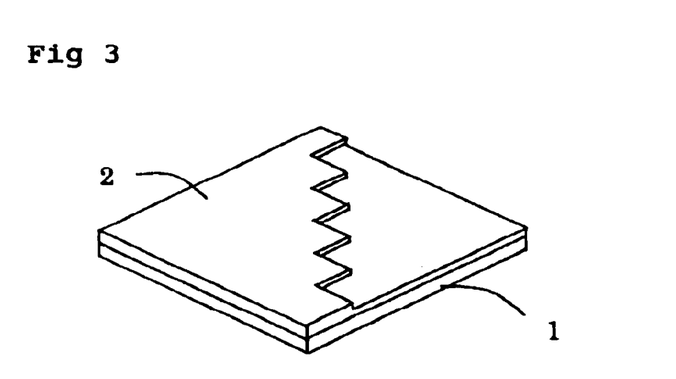
FIG. 3 is a perspective view of another echelon diffraction grating of the present invention, wherein the surfaces of the steps are formed in a direction perpendicular to the main surface of the organopolysiloxane film.

Thus, according to the present invention, an organosiloxane film 2 having a heat resistance of 350° C., a maximum thickness (thickness measured at a convex portion of the surface) of 1 $\mu$m to 1 mm, preferably 20 to 100 $\mu$m and a refractive index of 1.50 to 1.54 which is close to that of general glass, and whose fine concave and convex portions are formed on the main surface or in a direction perpendicular to the main surface is formed on a flat plate-like or curved plate-like substrate 1. The steps 3 of the echelon diffraction grating may be formed on the main surface of this organopolyxiloxane film as illustrated in FIG. 1 or in a direction perpendicular to the main surface of the organopolysiloxane film as illustrated in FIG. 3 and as shown in FIG. 3 or FIG. 4 of JP-A 62-287210. The organopolysiloxane forming this film contains dimethylsiloxane and a phenylsiloxane in a molar ratio of 1:0.3 to 1:9, preferably 10:90 to 75:25. The organopolysiloxane forming the film contains a methyl group in an amount of 5 to 25 wt %, preferably 15 to 22 wt % and a phenyl group (or substituted phenyl group) in an amount of 5 to 40 wt %, preferably 26 to 37 wt %. This film has high elasticity (low fragility) and high strength and hardly cracks. Foaming is not observed in the interior of the film at the time of molding, whereby excellent transferability can be realized with the result of high dimensional accuracy of the fine uneven surface of the film. In concrete terms, when a large number of convex portions having a height of 20 to 100 $\mu$m are formed, nonuniformity in height among the convex portions on the surface of the film is 1 $\mu$m or less. The deviation of the interval between the convex portions on the surface from that of the mold is below measurement accuracy (0.2 $\mu$m).

The substrate used in the present invention may have any shape such as a flat plate-like or curved plate-like shape. The substrate preferably has a warp (length of thermal deformation in a direction perpendicular to the surface of the substrate per unit length in the surface direction of the substrate) of the surface at 200 and 20° C. of ±5 $\mu$m or less per 1 cm. When the warp is beyond this range, the film may peel off from the substrate at the interface or may crack in the molding step. Therefore, it is preferred to select the material, size and shape of the substrate.

This substrate preferably has a linear expansion coefficient of $1.5 \times 10^{-5}/°$ C. or less. When the linear expansion coefficient of the substrate is larger than $1.5 \times 10^{-5}/°$ C., in the case of a plastic substrate having a high thermal expansion coefficient such as polypropylene (9 to $15 \times 10^{-5}/°$ C.), the film may peel off from the substrate at the interface or may crack in the step of forming an organopolysiloxane film. Ordinary inorganic glass has a linear expansion coefficient of $1.5 \times 10^{-5}/°$ C. or less. At least the surface of the substrate is made from an oxide. When the surface of the substrate in contact with the organopolysiloxane film is not made from an oxide, adhesion strength tends to be small in the film formation step, whereby the film may peel off from the substrate at the interface. Preferred examples of the material of the substrate include oxide glasses such as silicate-based glass, boric acid-based glass and phosphoric acid-based glass, quartz, ceramics, silicon, metals, epoxy resins and glass fiber reinforced polystyrene. A 0.5 to 5 mm thick plate made from glass or quartz having a high transmission of light having a wavelength in use is preferably used as the substrate of a transmission type echelon diffraction grating having steps formed on the main surface of the above organopolysiloxane film. Although the organopolysiloxane film is hardly bonded to a metal as it is, if the surface of the metal is treated with an oxidizing agent, the metal can be advantageously used as the substrate.

A description is subsequently given of the material of the optical waveguide element of the present invention.

The same material as the material forming the echelon diffraction grating of the present invention can be preferably used as the material of the optical waveguide element of the present invention. A polyorganosiloxane containing dimethylsiloxane represented by the above formula (1) has a lower refractive index than a polyorganosiloxane containing a phenylsiloxane (or substituted phenylsiloxane) represented by the above formula (2). Therefore, a material containing a relatively large amount of dimethylsiloxane represented by the above formula (1) may be used in the clad portion of the optical waveguide element of the present invention and a material containing a larger amount of a phenylsiloxane (or substituted phenylsiloxane) represented by the above formula (2) than the material of the clad portion may be used in the core portion. The core portion of the optical waveguide element obtained thereby has a 0.002 to 0.10 larger refractive index than the clad portion. Phenyltriethoxysilane has a refractive index of 1.4718 and dimethylethoxysilane has a refractive index of 1.3805.

When the polyorganosiloxane of the present invention is used in an optical waveguide and a transmission type diffraction grating, a material which provides a substituted phenylsiloxane or substituted dimethylsiloxane having CD group or CF group substituted for CH group is preferably used to improve the absorption loss of light having a wavelength of 1.55 $\mu$m caused by the absorption of light (1.63 $\mu$m) by CH group.

The sol-gel material containing dimethylsiloxane represented by the above formula (1) and a phenyl (or substituted phenyl)siloxane represented by the above formula (2) has heat resistance. Therefore, as a dehydration/condensation reaction can be carried out to the full by increasing the treatment temperature at the time of production and the generation of the residual OH group which absorbs light having a wavelength of 1.42 $\mu$m can be prevented, thereby providing a material having a lower loss of light having a wavelength of 1.55 $\mu$m.

A description is subsequently given of processes for forming the optical waveguide element of the present invention.

The first process (the above mold pouring process) comprises pouring a sold-gel material solution into a mold having a groove as a concave portion, heating, contacting a substrate to the material and further heating to bond the substrate to the molded film, releasing the mold and finally heating. The organopolysiloxane film of the present invention thus formed and bonded to the surface of the substrate has a core of a thin and long a convex linear portion. (ridge) transferred by the groove as a concave portion of the mold, thereby obtaining a channel type optical waveguide. The substrate is preferably made from a material having a smaller refractive index than the above organopolysiloxane film. When the substrate is made from another material, it is preferred to coat the entire surface or the surface where the core is provided of the substrate with a material having a smaller refractive index than the above organopolysiloxane film. The organopolysiloxane film of the present invention can be used as the coating.

The second process (the above mold pouring process) comprises pouring a sol-gel material solution containing a relatively large amount of dimethylsiloxane into a mold having a thin and long convex portion, heating, contacting a substrate to the material and further heating to bond the substrate to the molded film, releasing the mold and finally heating. The organopolysiloxane film thus formed and bonded to the surface of the substrate has a groove as a concave portion transferred by the convex portion of the mold. This concave portion is filled with a material having a higher refractive index than a material forming the concave portion (a sol-gel material containing more phenylsiloxane than the material forming the concave portion) and heated to obtain a stepped optical waveguide.

The third process (above mold pouring process) comprises pouring a sold-gel material solution containing a relatively large amount of a silsequioxy group containing a methyl group into a mold having a thin and long convex portion, heating, contacting a substrate to the material and further heating to bond the substrate to the molded film, releasing the mold and finally heating to form an organopolysiloxane film having a concave portion. The concave portion is filled with a material (a sol-gel material containing more phenylsiloxane than in the material forming the concave portion) having a higher refractive index than a material forming the concave portion and heated to form a core portion, coated with a material having the same refractive index as the concave portion and heated. Thus, an embedded optical waveguide comprising the organopolysiloxane film of a core portion formed on the substrate and the organopolysiloxane film of a clad portion around the core portion is obtained.

EXAMPLES

A preferred embodiment of the present invention will be described in detail hereinafter.

A process for producing an article having a fine uneven surface is roughly carried out by the following procedure.

(1) preparation of an organopolysiloxane solution, (2) application of the solution to a mold or a substrate and heat treatment, (3) bonding, heat treatment and mold release, and (4) final heating (baking).

Preparation of Organopolysiloxane Solution (Solution A):

0.1 mol of phenyltriethoxysilane and 0.15 mol of dimethyl diethoxysilane were charged into a beaker and stirred. 0.25 mol of ethanol was added to this solution and stirred, and an aqueous solution containing 0.1 wt % of formic acid dissolved in 1.75 mols (31.5 g) of water was further added and stirred for 2 hours. At the beginning of agitation, the solution was separated into two layers but after 2 hours of agitation, the solution became a transparent homogeneous solution. When this solution was heated at 80° C. in an oven for 12 hours, ethanol and water formed from the aqueous solution of formic acid and a polycondensation reaction volatilized. As a result, the solution which initially had a weight of about 91.2 g and a volume of about 100 $cm^3$ was reduced to about 30% of the initial weight and the initial volume (that is, a weight of about 27 g and a volume of about 30 $cm^3$). The thus obtained solution was designated as solution A. The solution A rarely contained ethanol and water but about 50% of ethoxy groups initially contained in phenyltriethoxysilane and dimethyldiethoxysilane remained in the solution as OH groups.

Preparation of Organopolysiloxane Solution (Solution B):

0.2 mol of phenyltriethoxysilane and 0.1 mol of dimethyldiethoxysilane were charged into a beaker and stirred. 0.25 mol of ethanol was added to this solution and stirred, and an aqueous solution containing 0.1 wt % of formic acid dissolved in 1.75 mols (31.5 g) of water was further added and stirred for 2 hours. At the beginning of agitation, the solution was separated into two layers but after 2 hours of agitation, the solution became a transparent homogeneous solution. When this solution was heated at 80° C. in an oven for 12 hours, ethanol and water formed from the aqueous solution of formic acid and a polycondensation reaction volatilized. As a result, the solution which initially had a weight of about 91.2 g and a volume of about 100 $cm^3$ was reduced to about 30% of the initial weight and the initial volume (that is, a weight of about 27 g and a volume of about 30 $cm^3$). The thus obtained solution was designated as solution B. The solution B rarely contained ethanol and water but about 50% of ethoxy groups initially contained in phenyltriethoxysilane and dimethyldiethoxysilane remained in the solution as OH groups.

Application of Solution to Mold or Substrate and Heat Treatment:

The above solution A was poured over the surface of a mold in the mold pouring process or over the surface of a substrate in the substrate pouring process to form a layer having a thickness of 50 μm to 1 mm and heated at a temperature of 140 to 180° C. for 20 to 120 minutes. The heat treatment temperature differs according to the type of the solution. The heat treatment of the solution A was started at a temperature of 140 to 160° C. and the temperature was gradually raised to 180° C. over 20 minutes and maintained at that temperature for 40 minutes. A plastic and transformable gelled film (viscosity: $10^4$ to $10^8$ poise) could be formed on the mold or substrate by the above heat treatment.

Bonding, Heat Treatment and Mold Release:

In the mold pouring process, the above coated surface (gelled film) was contacted to the surface of the substrate and heated at a temperature of 160 to 250° C. for 20 to 60 minutes to be bonded to the substrate. After the coating film was completely gelled, the mold was pilled off from the substrate to be released. As a result, a fine uneven plate comprising the film having a shape transferred from the mold and bonded to the surface of the substrate was obtained.

In the substrate pouring process, the mold was applied to the gelled film and heated at 250° C. for 20 minutes while being pressed at a pressure of 2 kg/$cm^2$. Thereafter, the mold was released. As a result, a fine uneven plate comprising the film having a shape transferred from the mold and bonded to the surface of the substrate was obtained.

Final Heating:

The fine uneven plate obtained by releasing the mold was heated at 350° C. for 15 minutes to obtain an article having an uneven surface.

The performance and characteristic properties of the obtained article having an uneven surface were evaluated by the following methods.

Measurement of Nonuniformity in Height Among Convex Portions:

Nonuniformity in height among convex portions of the outermost layer was measured by a laser microscope.

Measurement of Heat Resistance and Optical Properties:

After a heat resistance test was conducted on articles having an uneven surface produced in Examples and Comparative Examples by keeping them at 300° C. for 2 hours, the existence of cracks was checked by returning the temperature to room temperature to evaluate heat resistance. A He—Ne laser was used to measure the diffraction pattern of a diffraction grating before and after the heat resistance test for evaluation.

Example 1

A 2.5 cm×2.5 cm soda-lime glass substrate having a thickness of 3.0 mm (linear expansion coefficient of 1.0×

$10^{-5}/°$ C.) was subjected to ultrasonic alkali cleaning and further to pure water cleaning as a glass substrate. A 2.5 cm×2.5 cm silicon echelon diffraction grating having an average thickness of 2.0 mm (about 1,000 linear convex portions were formed on the surface of a silicon substrate by masking and etching, inclined surfaces on both sides of each convex portion agreed with a silicon crystal surface (1,1,1), the step height was 20.15 $\mu$m and the step width was 14.3 $\mu$m, the interval between adjacent grating lines (measured at ridges) was about 24.7 $\mu$m, and the flat portion at top of each ridge (length of the remaining unetched portion) was about 5.0 $\mu$m) was prepared as a mold. A fine uneven plate which was a reflection type echelon diffraction grating having a film thickness in a flat area (area devoid of the linear projection portions) of about 40 $\mu$m was formed using the above substrate, mold and solution A in accordance with the substrate pouring process. The thickness of the coating of the solution was about 60 $\mu$m, a heat treatment after coating was started at 160° C. and the temperature was gradually raised to 180° C. over 20 minutes and maintained at that temperature for 40 minutes. The pressing and heating conditions included a pressure of 2 kg/cm$^2$, a temperature of 250° C. and a time of 20 minutes. The final heating conditions included a temperature of 350° C. and a time of 15 minutes.

The thus formed organopolysiloxane film was transparent, had a flat area thickness of about 40 $\mu$m and a refractive index of 1.51. A methyl group and a phenyl group were contained in the film in amounts of 18 wt % and 31 wt %, respectively. The film contained dimethylsiloxane in an amount of 60 mol % and a phenylsiloxane in an amount of 40 mol %. As for the step height of the fine uneven plate, when 100 points were measured at intervals of 9 mm in a lengthwise direction of each of 10 linear convex portions selected at random, the average height of the convex portions was 20.2 $\mu$m and a standard deviation thereof was 0.05 $\mu$m. Thus, a reflection type echelon diffraction grating which was a fine uneven plate capable of blazing light having a wavelength of 1.55 $\mu$m as 26-th order diffracted light and light having a wavelength of 1.30 $\mu$m as 31-st order diffracted light efficiently was obtained. When the heat resistance of this fine uneven plate was evaluated, cracking did not occur in the film, and no changes in the appearance and the height of each convex portion of the film, standard deviation thereof and diffraction pattern were seen before and after the heat resistance test.

Comparative Example 1

Methyltriethoxysilane, ethanol and water were mixed together in a molar concentration ratio of 1:1:4, and 0.01 mol of hydrochloric acid was added as a catalyst to the obtained solution and stirred at room temperature for about 30 minutes to prepare a sol solution.

A fine uneven plate was formed in the same manner as in Example 1 using the same substrate and mold as in Example 1 except that the above sol solution was used in place of the solution A used in Example 1. However, as cracking occurred in the film during cooling after final heating at 350° C. and part of the film peeled off, the size of the film could not be measured. When the heat resistance of this fine uneven plate was evaluated, a crack in the film further expanded and part of the film further peeled off. Therefore, the height of the convex portion of the film after the heat resistance test and a standard deviation thereof could not be measured and the diffraction pattern showed a big change before and after the heat resistance test.

Comparative Example 2

Phenyltriethoxysilane, ethanol and water were mixed together in a molar concentration ratio of 1:1:4, and 0.01 mol of hydrochloric acid was added as a catalyst to the obtained solution and stirred at room temperature for about 30 minutes to prepare a sol solution.

A fine uneven plate was formed in the same manner as in Example 1 using the same substrate and mold as in Example 1 except that the above sol solution was used in place of the solution A used in Example 1. However, as cracking occurred in the film during cooling after final heating at 350° C. and part of the film peeled off like the methyltriethoxysilane of Comparative Example 1, the size of the film could not be measured. The diffraction pattern of this fine uneven plate showed a big change before and after the heat resistance test.

Example 2

A 2.5 cm×2.5 cm silicon substrate having a thickness of 1.0 mm was subjected to ultrasonic alkali cleaning and further to pure water cleaning as a substrate. A 2.5 cm×2.5 cm aluminum plate having a thickness of 2.0 mm and a convex portion having a height of 10 $\mu$m, a width of 10 $\mu$m and a length of 20 mm was prepared as a mold. A plate having a concave portion as a clad portion was formed using the above substrate, mold and solution A in accordance with the substrate pouring process to ensure that the thickness of a film in the lowest area (portion in contact with the convex portion of the above mold) should become about 10 $\mu$m. A heat treatment after coating was started at 160° C. and the temperature was gradually raised to 180° C. over 20 minutes and maintained at that temperature for 40 minutes. The pressing and heating conditions included a pressure of 2 kg/cm$^2$, a temperature of 250° C. and a time of 20 minutes. The mold was then released, the solution B was poured into a concave portion as a core portion and heated at 160° C., and the temperature was gradually raised to 180° C. over 20 minutes and maintained at that temperature for 20 minutes. The solution A for forming the clad portion was applied to a thickness of about 10 $\mu$m and heated at 250° C. for 20 minutes.

The thus formed organopolysiloxane film was transparent, and an embedded optical waveguide having a core portion having a height of 8 $\mu$m, a width of 8 $\mu$m and a length of 20 mm and a high refractive index of 1.440 and a clad portion having a low refractive index of 1.420 and surrounding the core portion was formed. When the heat resistance of this optical waveguide was evaluated, cracking did not occur in the film and, and no changes in the appearance of the film, the height and width of the core portion of the film, standard deviations thereof and the transmission of light having a wavelength of 1.55 $\mu$m were seen before and after the heat resistance test.

Example 3

An organopolysiloxane solution (solution C) was prepared in the same manner as the above solution (A) except that 0.1 mol of phenyltriethoxysilane and 0.175 mol of dimethyldiethoxysilane were used in place of 0.1 mol of phenyltriethoxysilane and 0.15 mol of dimethyldiethoxysilane.

A 2.5 cm×2.5 cm aluminum plate having a thickness of 2.0 mm and a groove as a concave portion having a depth of 2 $\mu$m, a width of 2 $\mu$m and a length of 20 mm was prepared as a mold. The mold was placed horizontal with the groove as a concave portion facing up, the above solution C was poured into the groove as a concave portion and heated at 150° C. for 15 minutes, a 2.5 cm×2.5 cm quartz glass (refractive index of 1.460) substrate having a thickness of 1.0 mm was placed on the above mold, and the mold and the quartz glass substrate were inverted together. They were maintained at 200° C. for 30 minutes while the molded film in the groove as a concave portion was contacted to the surface of the substrate, and the mold was released to obtain a channel type optical waveguide having an organopolysiloxane optical transmitting portion (refractive index of 1.48) having a height of 1.8 µm, a width of 2 µm and a length of 20 mm formed on the quartz glass substrate.

Example 4

A plate having a concave portion was formed in the same manner as in Example 2 using the same silicon substrate, mold and solution A as in Example 2, the solution B was then poured into the concave portion and heated at 160° C., and the temperature was gradually raised to 180° C. over 20 minutes and maintained at that temperature for 20 minutes. Thereby, a stepped waveguide having a core portion having a height of 8 µm, a width of 8 µm, a length of 20 mm and a high refractive index of 1.440 and a clad portion having a low refractive index of 1.420 and surrounding the core portion (excluding the top surface of the core) was formed.

Example 5

1 mol of methacryloxypropyl trimethoxysilane and a 0.1 N hydrochloric acid aqueous solution containing 3 mols of water were mixed together and stirred at room temperature for 2 hours to obtain a homogenous solution (solution D). 1 mol of methacrylic acid was added to 1 mol of zirconium tetra-n-butoxide and stirred at room temperature for 2 hours to obtain a homogenous solution (solution E). The solutions D and E were mixed together in a weight ratio of 1:2, 2-hydroxy-2-methyl-1-phenylpropan-1-on (Darocure1173 of Merc Co., Ltd.) was added as a photoinitiator in an amount of 1 wt % based on the total weight to obtain a photosensitive film forming solution (solution F). The solution A was applied to the surface of a 2.5 cm×2.5 cm silicon substrate having a thickness of 1.0 mm to a final thickness of 8 µm by spin coating and dried at 120° C. for 5 minutes (first layer). The solution F was then applied to the above layer to a final thickness of 8 µm by spin coating and dried at 120° C. for 5 minutes (second layer). Further, the solution A was applied to the above layer to a final thickness of 8 µm by spin coating and dried at 120° C. for 5 minutes to form a third layer so as to obtain a three-layered laminate film. A 2.5 cm×2.5 cm photomask having a linear exposure portion having a width of 8 µm and a length of about 20 mm was contacted to the surface of the laminate film and irradiated with ultraviolet radiation having maximum emission at 360 nm for 30 seconds using a high-pressure mercury lamp. By the irradiation of ultraviolet radiation, the exposed portion of the photosensitive layer (second layer) formed a core portion (refractive index of 1.50) due to an increase in refractive index caused by an increase in density resulted by the photopolymerization of the photosensitive group (methacryl group) contained in the exposed potion. The unexposed portion of the photosensitive layer (second layer) formed a clad portion having a low refractive index (1.48) because the photosensitive group (methacryl group) was not photopolymerized and the density was not increased. The first and third layers showed a refractive index of 1.48. Thus, an embedded optical waveguide having a core portion having a height of about 8 µm, a width of about 8 µm and a length of about 20 mm (refractive index of 1.50) and a clad portion formed by the unexposed portions of the first and second layers and the third layer, having a refractive index of 1.48 and surrounding the core portion was thus obtained.

Example 6

An echelon diffraction grating was produced in the same manner as in Example 1 except that 0.1 mol of chlorophenyltriethoxysilane was used in place of 0.1 mol of phenyltriethoxysilane used in the preparation of the solution A and a solution prepared in the same manner as the solution A was used in place of the solution A. The obtained echelon diffraction grating had substantially the same characteristic properties as Example 1.

As described above, according to the present invention, since the volume shrinkage of a polysiloxane film at the time of curing is small and a methyl group and a phenyl group remain in the film in large quantities to provide high elasticity to the film (less fragile), an echelon diffraction grating which has high film strength and hardly experiences the cracking of the film is obtained. Therefore, a diffraction grating and an optical waveguide having high heat resistance due to a thick organopolysiloxane film can be obtained at a low cost.

What is claimed is:

1. An echelon diffraction grating which comprises a substrate and an organopolysiloxane film having a maximum thickness of 1 µm to 1 mm formed on the surface of the substrate, and said organopolysiloxane film having a plurality of steps having a predetermined height of 5 to 500 µm and a predetermined width of 1 to 500 µm, wherein the organopolysiloxane film contains dimethylsiloxane represented by the following chemical formula (1) and a phenylsiloxane represented by the following chemical formula (2) as essential ingredients:

(1)

(2)

wherein Ph is a phenyl group or substituted phenyl group.

2. The echelon diffraction grating of claim 1, wherein the organopolysiloxane film contains the dimethylsiloxane and the phenylsiloxane in a molar ratio of 1:0.3 to 1:9.

3. The echelon diffraction grating of claim 1, wherein the above steps are formed along the main surface of the organopolysiloxane film.

4. The echelon diffraction grating of claim 1, wherein the above steps are formed in a direction perpendicular to the main surface of the organopolysiloxane film.

5. The echelon diffraction grating of claim 1, wherein the step height is suitable for blazing one of light having a wavelength of 1.55 µm and light having a wavelength of 1.3 µm or both of them at the same time.

* * * * *